(12) United States Patent
Gueta et al.

(10) Patent No.: US 10,198,429 B2
(45) Date of Patent: Feb. 5, 2019

(54) AUTOMATIC TEXT LANGUAGE SELECTION MECHANISM

(71) Applicant: Intel Corporation, Santa Clara, CA (US)

(72) Inventors: Orit Gueta, Kiryat Gat (IL); Guy Rain, Yad Natan (IL); Daphna Avioz, Yehud (IL); Tal Zrahia, Rishon Letzion (IL); Hila Levy, Beit Ezra (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/974,538

(22) Filed: Dec. 18, 2015

(65) Prior Publication Data

US 2017/0177560 A1    Jun. 22, 2017

(51) Int. Cl.
*G06F 17/20* (2006.01)
*G06F 17/27* (2006.01)
*G06F 17/22* (2006.01)

(52) U.S. Cl.
CPC ............ *G06F 17/275* (2013.01); *G06F 17/22* (2013.01)

(58) Field of Classification Search
CPC ....... G06F 17/275; G06F 17/22; G10L 13/08; G10L 15/005
USPC .......................................... 704/8, 9, 251, 257
See application file for complete search history.

(56) References Cited

U.S. PATENT DOCUMENTS

2008/0208855 A1* 8/2008 Lingenfelder .... G06F 17/30592
2011/0209055 A1* 8/2011 Plestid .................. G06F 3/0237
715/265

FOREIGN PATENT DOCUMENTS

JP         2000231559 A   *   8/2000

* cited by examiner

*Primary Examiner* — Thierry L Pham
(74) *Attorney, Agent, or Firm* — Womble Bond Dickinson (US) LLP

(57) ABSTRACT

A mechanism is described for facilitating automatic selection of a text language for a message according to one embodiment. A method of embodiments, as described herein, includes scanning text received in a message, calculating an average character code value for characters in the message and automatically selecting a text language for a response message based on a range of the average character code value.

22 Claims, 6 Drawing Sheets

AUTOMATIC TEXT LANGUAGE SELECTION MECHANISM

FIELD

Embodiments described herein generally relate to computers. More particularly, embodiments relate to facilitating automatic selection of text languages.

BACKGROUND

It is fairly common for users of computing devices, such as mobile computers, to communicate through textual messaging (e.g., emails, short message service (SMS) messages, instant messages through instant messaging (IM), word processing applications, etc.). A known problem for bilingual users of computing devices is the need to frequently change language when creating a text document. Currently, a device or text application defines a default text language. However, whenever a user wishes to generate text in a language other than the default text, a manual switch of the language, and sometimes the script direction (e.g., left to right or right to left), is required. For example, a Hebrew and English bilingual user would manually have to change the language to generate text in English if the text application has a Hebrew language default, or vice versa.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for selecting a textual language in which a message is to be generated. In such embodiments, text received via an application is scanned and an average character code is calculated for all characters in a selected section of the text. Subsequently, a text language is automatically selected based on the calculated average character code, and is set as the textual language to type a reply message.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to text-to-speech selections, voice profiles, speech characteristics, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 1:
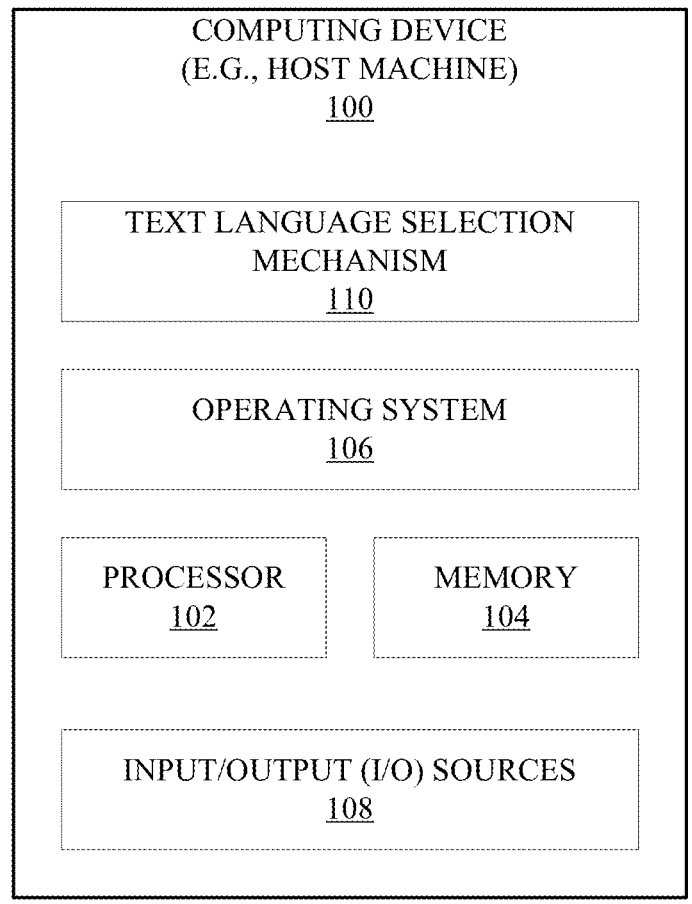
FIG. 1 illustrates one embodiment of a computing device employing a text language selection mechanism.
Figure 2:
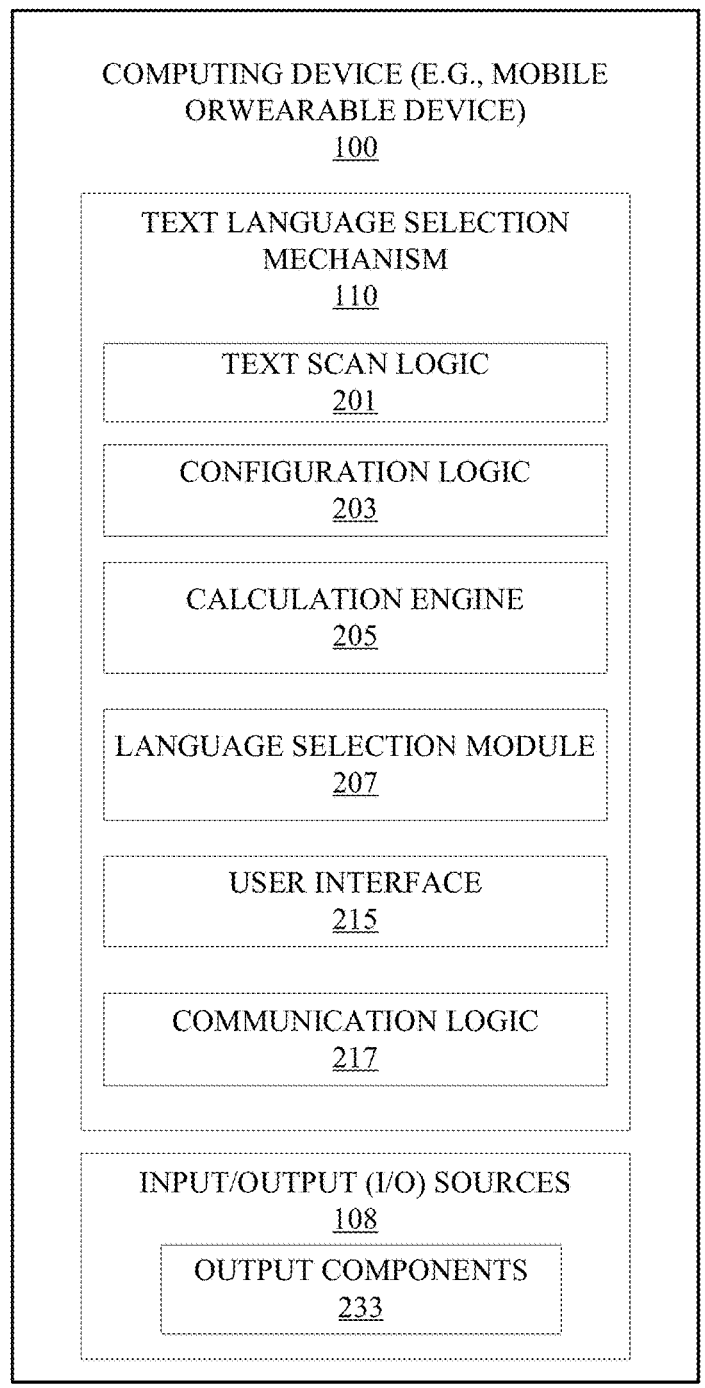
FIG. 2 illustrates one embodiment of a text language selection mechanism.

FIG. 1 illustrates a computing device 100 employing a text language selection (or selection) mechanism 110 according to one embodiment. Computing device 100 serves as a host machine for hosting text language selection mechanism ("selection mechanism") 110 that includes any number and type of components, as illustrated in FIG. 2, to facilitate automatic selection of a language in which text is to be written in a message, as will be further described throughout this document.

In one embodiment, selection mechanism 110 may be hosted by computing device 100, such as a communication device including a mobile computer (e.g., smartphone, tablet computer, etc.), wearable computer (e.g., wearable glasses, smart bracelets, smartcards, smart watches, HMDs, etc.), and/or the like. In another embodiment, computing device 100 may be a larger communication machine, such as a server computer, a desktop computer, a laptop computer, etc., that is in communication with one or more smaller computing devices (e.g., mobile computer, such as a smartphone, a tablet computer, etc.) over a communication medium, such as one or more networks (e.g., Cloud network, the Internet, proximity network, such as Bluetooth, etc.).

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, "characteristic", "user", "receiver", "sender", "personal device", "location", "smart device", "mobile computer", "wearable device", etc., should not be read to limit embodiments to software or devices that carry that label in products or in literature external to this document.

FIG. 2 illustrates a text language selection mechanism 110 according to one embodiment. In this embodiment, text language selection mechanism 110 may include any number and type of components, such as (without limitation): text scan logic 201; configuration logic 203; calculation engine 205, language selection module 207, user interface 215; and communication logic 217.

Computing device 100 may include I/O source(s) 108 including one or more output components 233. Output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

Communication logic 217 is also included within device 100. Communication logic 217 may be used to facilitate dynamic communication and compatibility between with various other computing devices (such as a mobile computing device, a desktop computer, a server computing device, etc.), storage devices, databases and/or data sources, networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), connectivity and location management techniques, software applications/websites), programming languages, etc., while ensuring compatibility with changing technologies, parameters, protocols, standards, etc. In one embodiment, communication logic 217 receives textual messages from other computing devices for processing at textual selection mechanism 110.

Referring back to language selection mechanism 110, for example and in one embodiment, a textual message is received at computing device 100, where the message may include any number and type of text-based messages, such as a short message service (SMS) message, an instant message (IM), an email message, word processing document, etc. Upon a text message being received, scan logic 201 is triggered to perform a scan of the text. In one embodiment, scan logic 201 performs the scan by evaluating each character in the message according to a corresponding character encoding. In such an embodiment, a message includes American Standard Code for Information Interchange (ASCII) characters. Thus, scan logic 201 performs the scan by evaluating the ASCII code corresponding to each character in the message. However other embodiments may include other character encoding schemes (e.g., Unicode)

Configuration logic 203 configures a section of the text that is to be analyzed by calculation engine 205. In one embodiment, configuration logic 203 determines whether the entire document, final paragraph or final sentence of the text is to be analyzed. In a further embodiment, configuration logic 203 may prompt a user to enter a representative section of the document. Calculation engine 205 calculates an average character (e.g., ASCII) code value for characters in the section to be analyzed.

According to one embodiment, calculation engine 205 calculates the average character code by counting the number of characters in the scanned section. In such an embodiment, calculation engine 205 will retrieve a character code for each scanned and calculate the sum of the retrieved character codes. Subsequently, calculation engine 205 divides the code sum by the number of characters to generate the average code of the scanned section.

Language selection module 207 automatically selects a text language for a response (e.g., reply, forward, etc.) message to be generated by an application (or device) based on the range of the calculated average character code value. In one embodiment, language selection module 207 compares the average code to known language characters range according to the character code (e.g., ASCII) in order to determine the language to be used.

Figure 3:
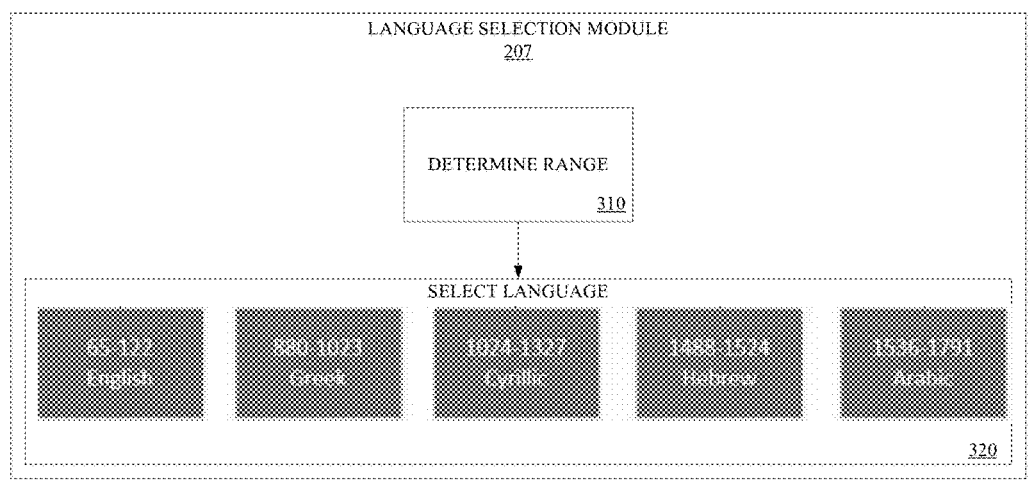
FIG. 3 illustrates one embodiment of a process performed by a language selection module.

FIG. 3 illustrates one embodiment of a process performed by language selection module 207. At processing block 310, language selection module 207 determines a range of the average character code received from calculation engine 205. At processing block 320, language selection module 207 selects a text language based on the range. In a further embodiment, the script direction for the language is also selected.

As shown in FIG. 3, English is selected if the range of the ASCII character code is 65-122. Similarly, Greek, Cyrillic, Hebrew and Arabic languages are selected for average ASCII character code value ranges of 880-1023, 1024-1327, 1488-1524 and 1536-1791, respectively. Other embodiments may feature selection of additional languages based on other average character code value ranges. In a further embodiment, language selection module 207 enables user language selection via user interface 215 in order to override automatic language selection. In such an embodiment, the user is prompted via user interface 215 as to whether the automatically selected, or a user specified language is to be used prior to beginning typing. In still a further embodiment, user interface 215 presents a keyboard configuration including characters of the selected language.

In a further embodiment, language selection module 207 may implement a bucket mechanism to provide more accuracy in edge cases (e.g., when the average calculation doesn't fall into a relevant range). For instance, an edge case may occur when a message is written in half Hebrew and half English, resulting in language selection module 207 selecting Cyrillic as the language. In such an embodiment, language selection module 207 defines buckets by a range of two (or more) used languages (e.g., 65-122 for English, 1488-1524 for Hebrew). Thus, when language selection module 207 encounters a character code having a particular value range (e.g. 65-122), it adds the character code to an English bucket; and encounters a character code having a second value range (e.g. 1488-1524), it adds the character code to a Hebrew bucket. Subsequently, language selection module 207 defines the language by selecting the bucket with most counted characters.

It is contemplated that any number and type of components may be added to and/or removed from real-speech mechanism 110 to facilitate various embodiments including adding, removing, and/or enhancing certain features. For brevity, clarity, and ease of understanding of real-speech mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 4:
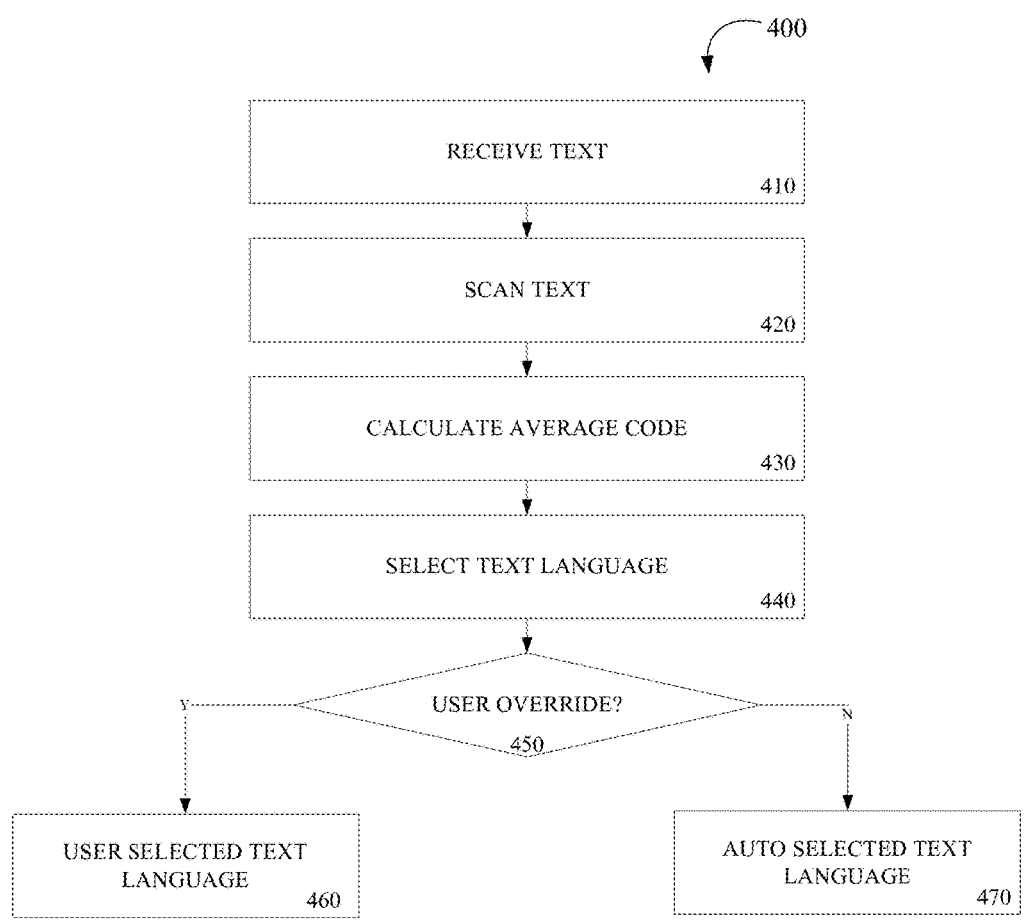
FIG. 4 is a flow diagram illustrating one embodiment of a text language selection process.

FIG. 4 illustrates an architectural placement 400 according to one embodiment. As an initial matter, for brevity, clarity, and ease of understanding, many of the components and processes discussed above with reference to FIGS. 1-3 may not be repeated or discussed hereafter. It is contemplated and to be noted that embodiments are not limited to any particular use case scenario, architectural setup, transaction sequence, etc., and that any number and type of components may be employed, placed, and used in any manner or form to perform the relevant tasks.

At processing block 410, text is received at computing device 100, or a textual application operating on the device 100. At processing block 420, the text is scanned. At processing block 430, the average character code is calculated for all characters in the section to be analyzed. At processing block 430, the text language is selected based on the calculated average character code. At decision block 450, a determination is made as to whether the user has selected a language that overrides the automatically selected language. The user selected language is set as the language to use if the automatically selected language is overridden, processing block 460. Otherwise, the automatically selected language is set as the language to type a message.

Figure 5:
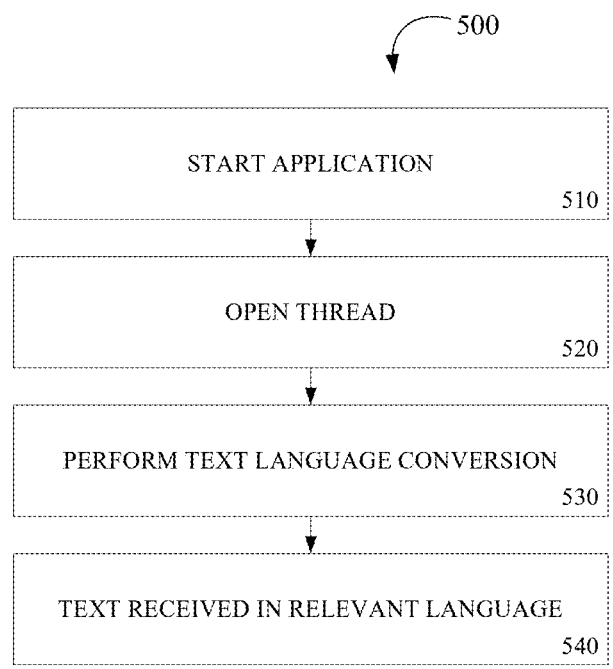
FIG. 5 is a flow diagram illustrating one embodiment of a text language selection mechanism implemented in a text application.

FIG. 5 illustrates an architectural placement 500 according to one embodiment. As an initial matter, for brevity, clarity, and ease of understanding, many of the components and processes discussed above with reference to FIGS. 1-4 may not be repeated or discussed hereafter. It is contemplated and to be noted that embodiments are not limited to any particular use case scenario, architectural setup, transaction sequence, etc., and that any number and type of components may be employed, placed, and used in any manner or form to perform the relevant tasks.

At processing block 510, a text application, such as an email application, operating at computing device 100 is started. At processing block 520, a thread within the application. Once the thread is open, text language selection mechanism 110 performs the above-described operations, processing block 530. At processing block 540, the application is set receive text in the selected language.

Figure 6:
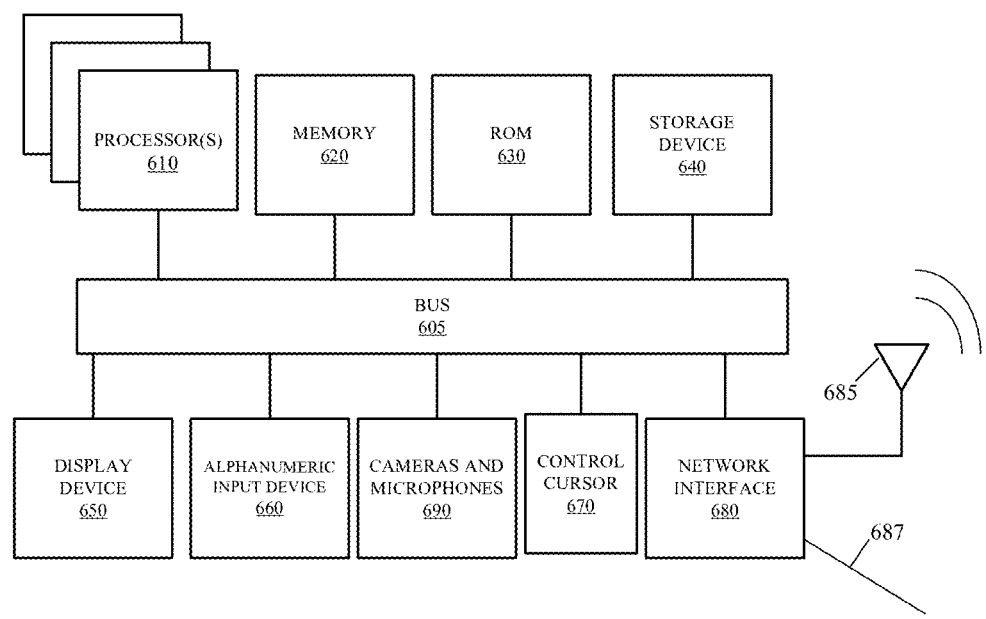
FIG. 6 illustrates one embodiment of a computer system.

FIG. 6 illustrates a computer system suitable for implementing embodiments of the present disclosure. Computing system 600 includes bus 605 (or, for example, a link, an interconnect, or another type of communication device or interface to communicate information) and processor 610 coupled to bus 405 that may process information. While computing system 600 is illustrated with a single processor, electronic system 600 and may include multiple processors and/or co-processors, such as one or more of central processors, graphics processors, and physics processors, etc. Computing system 600 may further include random access memory (RAM) or other dynamic storage device 620 (referred to as main memory), coupled to bus 605 and may store information and instructions that may be executed by processor 610. Main memory 620 may also be used to store temporary variables or other intermediate information during execution of instructions by processor 610.

Computing system 600 may also include read only memory (ROM) and/or other storage device 630 coupled to bus 605 that may store static information and instructions for processor 610. Date storage device 640 may be coupled to bus 405 to store information and instructions. Date storage device 640, such as magnetic disk or optical disc and corresponding drive may be coupled to computing system 600.

Computing system 600 may also be coupled via bus 605 to display device 650, such as a cathode ray tube (CRT), liquid crystal display (LCD) or Organic Light Emitting Diode (OLED) array, to display information to a user. User input device 660, including alphanumeric and other keys, may be coupled to bus 605 to communicate information and command selections to processor 610. Another type of user input device 660 is cursor control 670, such as a mouse, a trackball, a touchscreen, a touchpad, or cursor direction keys to communicate direction information and command selections to processor 610 and to control cursor movement on display 650. Camera and microphone arrays 690 of computer system 600 may be coupled to bus 605 to observe gestures, record audio and video and to receive and transmit visual and audio commands.

Computing system 600 may further include network interface(s) 680 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 680 may include, for example, a wireless network interface having antenna 685, which may represent one or more antenna(e). Network interface(s) 680 may also include, for example, a wired network interface to communicate with remote devices via network cable 687, which may be, for example, an Ethernet cable, a coaxial cable, a fiber optic cable, a serial cable, or a parallel cable.

Network interface(s) 680 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 680 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 680 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 600 may vary from implementation to implementation depending upon numerous factors, such as price constraints, performance requirements, technological improvements, or other circumstances. Examples of the electronic device or computer system 600 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable (or computer-readable) media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a text language selection apparatus comprising text scan logic to scan text received in a message, calculation engine to calculate an average character code value for characters in the message and language selection module to automatically select a text language for a response message based on a range of the average character code value.

Example 2 includes the subject matter of Example 1, further comprising configuration logic to configure a section of the text that is to be analyzed by calculation engine.

Example 3 includes the subject matter of Examples 1 and 2, wherein the section of the text comprises one of the entire message, a paragraph in the message and a sentence in the message.

Example 4 includes the subject matter of Examples 1-3, wherein scanning the text comprises evaluating each character in the message according to a corresponding character encoding Example 5 includes the subject matter of Examples 1-4, wherein the text character encoding comprises American Standard Code for Information Interchange (ASCII) characters.

Example 6 includes the subject matter of Examples 1-5, wherein the language selection module selects a text language by comparing the average character code to known language character code ranges.

Example 7 includes the subject matter of Examples 1-6, wherein the language selection module implements a bucket mechanism to select the text language.

Example 8 includes the subject matter of Examples 1-7, wherein the language selection module selects a first text language to generate the response message upon determining the average character code value is within a first range.

Example 9 includes the subject matter of Examples 1-8, wherein the language selection module selects a second text language to generate the response message upon determining the average character code value is within a second range.

Some embodiments pertain to Example 10 that includes a text language selection method comprising scanning text received in a message, calculating an average character code value for characters in the message and automatically selecting a text language for a response message based on a range of the average character code value.

Example 11 includes the subject matter of Example 10, further comprising configuring a section of the text that is to be analyzed.

Example 12 includes the subject matter of Examples 10 and 11, wherein scanning the text comprises evaluating each character in the message according to a corresponding character encoding.

Example 13 includes the subject matter of Examples 1-12, wherein the text character encoding comprises American Standard Code for Information Interchange (ASCII) characters.

Example 14 includes the subject matter of Examples 1-13, wherein the text character encoding comprises Unicode characters.

Example 15 includes the subject matter of Examples 1-14, wherein selecting the text language comprises comparing the average character code to known language character code ranges.

Example 16 includes the subject matter of Examples 1-15, wherein selecting the text language comprises selecting a first text language to generate the response message upon determining the average character code value is within a first range.

Example 17 includes the subject matter of Examples 1-16, wherein selecting the text language further comprises selecting a second text language to generate the response message upon determining the average character code value is within a second range.

Example 18 includes the subject matter of Examples 1-17, further comprising determining whether a request to override the selected text language has been received and setting a user selected text language for the response message upon determining that a request to override the selected text language has been received.

Example 19 includes the subject matter of Examples 1-18, further comprising setting the automatically selected text language for the response message upon determining that a request to override the selected text language has not been received.

Some embodiments pertain to Example 20 that includes at least one computer readable medium having instructions stored thereon, which when executed by a processor, cause the processor to perform the methods of claims 10-19.

Some embodiments pertain to Example 21 that includes at least one computer readable medium having instructions stored thereon, which when executed by a processor, cause the processor to scan text received in a message, calculate an average character code value for characters in the message and automatically select a text language for a response message based on a range of the average character code value Example 22 includes the subject matter of Example 21, having instructions stored thereon, which when executed by a processor, further cause the processor to configure a section of the text that is to be analyzed.

Example 23 includes the subject matter of Examples 21 and 22, wherein the section of the text comprises one of the entire message, a paragraph in the message and a sentence in the message.

Example 24 includes the subject matter of Examples 21-23, wherein scanning the text comprises evaluating each character in the message according to a corresponding character encoding.

Example 25 includes the subject matter of Examples 21-24, wherein selecting the text language comprises comparing the average character code to known language character code ranges.

Example 26 includes the subject matter of Examples 21-25, wherein selecting the text language comprises selecting a first text language to generate the response message upon determining the average character code value is within a first range and selecting a second text language to generate the response message upon determining the average character code value is within a second range.

Some embodiments pertain to Example 27 that includes a text language selection apparatus comprising means for scanning text received in a message, means for calculating an average character code value for characters in the message and means for automatically selecting a text language for a response message based on a range of the average character code value.

Example 28 includes the subject matter of Example 27, further comprising means for configuring a section of the text that is to be analyzed.

Example 29 includes the subject matter of Examples 27 and 28, wherein the section of the text comprises one of the entire message, a paragraph in the message and a sentence in the message.

Example 30 includes the subject matter of Examples 27-29, wherein the means for scanning the text comprises means for evaluating each character in the message according to a corresponding character encoding.

Example 31 includes the subject matter of Examples 27-30, wherein the means for selecting the text language comprises means for comparing the average character code to known language character code ranges.

Example 32 includes the subject matter of Examples 27-31, wherein the means for selecting the text language comprises means for selecting a first text language to generate the response message upon determining the average character code value is within a first range and means for selecting a second text language to generate the response message upon determining the average character code value is within a second range.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A text language selection apparatus comprising:
   a processor; and
   a storage device to store:
   text scan logic executed by the processor to scan text received in a message;
   calculation engine executed by the processor to calculate an average character code value for characters in the text scanned in the message based on a sum of character codes associated with each of the characters and a number of characters in the text of the message; and
   language selection module executed by the processor to automatically select a text language for a response message based on a range of the average character code value, wherein the language selection module is operable to select a text language by comparing the average character code value for characters to known language character code ranges.

2. The apparatus of claim 1, wherein the storage device further stores configuration logic executed by the processor to configure a section of the text that is to be analyzed by calculation engine.

3. The apparatus of claim 2, wherein the section of the text comprises one of the entire message, a paragraph in the message and a sentence in the message.

4. The apparatus of claim 1, wherein scanning the text comprises evaluating each character in the message according to a corresponding character encoding.

5. The apparatus of claim 4, wherein the text character encoding comprises American Standard Code for Information Interchange (ASCII) characters.

6. The apparatus of claim 1, wherein the language selection module implements a bucket mechanism to select the text language.

7. The apparatus of claim 1, wherein the language selection module selects a first text language to generate the response message upon determining the average character code value is within a first range.

8. The apparatus of claim 7, wherein the language selection module selects a second text language to generate the response message upon determining the average character code value is within a second range.

9. A text language selection method comprising:
scanning text received in a message;
calculating an average character code value for characters in the text scanned in the message based on a sum of character codes associated with each of the characters and a number of characters in the text of the message; and
automatically selecting a text language for a response message based on a range of the average character code value by comparing the average character code value for characters to known language character code ranges.

10. The method of claim 9, further comprising configuring a section of the text that is to be analyzed.

11. The method of claim 9, wherein scanning the text comprises evaluating each character in the message according to a corresponding character encoding.

12. The method of claim 11, wherein the text character encoding comprises American Standard Code for Information Interchange (ASCII) characters.

13. The method of claim 11, wherein the text character encoding comprises Unicode characters.

14. The method of claim 9, wherein selecting the text language comprises selecting a first text language to generate the response message upon determining the average character code value is within a first range.

15. The method of claim 14, wherein selecting the text language further comprises selecting a second text language to generate the response message upon determining the average character code value is within a second range.

16. The method of claim 9, further comprising:
determining whether a request to override the selected text language has been received; and
setting a user selected text language for the response message upon determining that a request to override the selected text language has been received.

17. The method of claim 16, further comprising setting the automatically selected text language for the response message upon determining that a request to override the selected text language has not been received.

18. At least one non-transitory computer readable medium having instructions stored thereon, which when executed by a processor, cause the processor to:
scan text received in a message;
calculate an average character code value for characters in the text scanned in the message based on a sum of character codes associated with each of the characters and a number of characters in the text of the message; and
automatically select a text language for a response message based on a range of the average character code value by comparing the average character code value for characters to known language character code ranges.

19. The at least one computer readable medium of claim 18, having instructions stored thereon, which when executed by a processor, further cause the processor to configure a section of the text that is to be analyzed.

20. The at least one computer readable medium of claim 19, wherein the section of the text comprises one of the entire message, a paragraph in the message and a sentence in the message.

21. The at least one computer readable medium of claim 18, wherein scanning the text comprises evaluating each character in the message according to a corresponding character encoding.

22. The at least one computer readable medium of claim 18, wherein selecting the text language comprises:
selecting a first text language to generate the response message upon determining the average character code value is within a first range; and
selecting a second text language to generate the response message upon determining the average character code value is within a second range.

* * * * *